(12) United States Patent
Shah et al.

(10) Patent No.: US 9,703,639 B1
(45) Date of Patent: *Jul. 11, 2017

(54) JOURNALING TOOL

(71) Applicant: Accenture Global Services Limited, Dublin (IE)

(72) Inventors: Jigar Hasmukhlal Shah, Mumbai (IN); Shailesh Nivruti Jadhav, Mumbai (IN); Swapnil Manmohan Goyal, Nagpur (IN); Chandramouli M, Chennai (IN); Soumendra Mohanty, Maharastra (IN)

(73) Assignee: Accenture Global Services Limited, Dublin (IE)

( * ) Notice: Subject to any disclaimer, the term of this patent is extended or adjusted under 35 U.S.C. 154(b) by 85 days.

This patent is subject to a terminal disclaimer.

(21) Appl. No.: 14/516,036

(22) Filed: Oct. 16, 2014

Related U.S. Application Data

(63) Continuation of application No. 13/009,425, filed on Jan. 19, 2011, now Pat. No. 8,892,503.

(51) Int. Cl.
*G06F 7/00* (2006.01)
*G06F 17/00* (2006.01)
(Continued)

(52) U.S. Cl.
CPC .... *G06F 11/1448* (2013.01); *G06F 17/30191* (2013.01)

(58) Field of Classification Search
CPC ......... G06F 17/30368; G06F 17/30578; G06F 17/30144; G06F 17/360572
See application file for complete search history.

(56) References Cited

U.S. PATENT DOCUMENTS 7,263,492 B1 * 8/2007 Suresh ............... G06F 19/327
  705/2
7,577,667 B2   8/2009 Hinshaw
(Continued)

OTHER PUBLICATIONS

Bedoya, et al. "Striving for Optimal Journal Performance on DB2 Universal Database for iSeries", May 2002, downloaded from the internet at: http://www.redbooks.ibm.com/redbooks/pdfs/sg246286. pdf on Nov. 14, 2011, 184 pages.

Miszczyk, et al. "AS/400 Remote Journaling Function for High Availability and Data Replication", Feb. 1999, downloaded from the internet at: http://www.redbooks.ibm.com/redbooks/pdfs/sg245189. pdf on Nov. 14, 2011, 130 pages.

(Continued)

*Primary Examiner* — Susan Chen
(74) *Attorney, Agent, or Firm* — Fish & Richardson P.C.

(57) ABSTRACT

Journaling technology, in which a tool, that is separate from a journaling process executed by a server system, causes display of an interface that enables user selection of information derivable from journaling data collected by the journaling process. The tool receives, through the displayed interface, user input selecting desired information derivable from the journaling data collected by the journaling process. Based on the user input, the tool determines one or more commands that are understood by the journaling process and that control the journaling process to retrieve journaling data needed to derive the desired information. The tool controls the journaling process to execute the one or more commands, accesses journaling data retrieved through execution of the one or more commands, and reformats the accessed journaling data into a presentable format of the desired information.

20 Claims, 16 Drawing Sheets

(51) Int. Cl.
*G06F 17/30* (2006.01)
*G06F 11/14* (2006.01)

(56) References Cited

U.S. PATENT DOCUMENTS

| | | | |
|---|---|---|---|
| 7,587,383 B2 | 9/2009 | Koo | |
| 7,966,638 B2 | 6/2011 | Gossweiler | |
| 8,126,904 B1 | 2/2012 | Bettinger | |
| 8,135,633 B1* | 3/2012 | LeBaron | G06Q 20/10 705/24 |
| 8,666,786 B1* | 3/2014 | Wirz | G06Q 40/08 705/30 |
| 8,892,503 B1* | 11/2014 | Shah | G06F 17/30144 707/601 |
| 2002/0169658 A1* | 11/2002 | Adler | G06Q 10/06 705/7.28 |
| 2005/0033777 A1 | 2/2005 | Moraes | |
| 2008/0183666 A1* | 7/2008 | Barsness | G06F 17/30306 |
| 2009/0287658 A1 | 11/2009 | Bennett | |
| 2011/0173089 A1 | 7/2011 | Tan | |
| 2011/0178932 A1 | 7/2011 | Johnson | |
| 2012/0174218 A1 | 7/2012 | McCoy | |

OTHER PUBLICATIONS

Stockwell, "Journal Management on the AS/400", Feb. 29, 1996, downloaded from the internet at: http://www.mcpressonline.com/operating-systems/ibm-i-os400-i5os/journal-management-on-the-as400.html on Nov. 14, 2011, 8 pages.

U.S. Non-Final Office Action for U.S. Appl. No. 13/009,425 dated Oct. 15, 2012, 19 pages.

U.S. Final Office Action for U.S. Appl. No. 13/009,425 dated Jan. 25, 2013, 18 pages.

U.S. Non-Final Office Action for U.S. Appl. No. 13/009,425 dated Apr. 4, 2014, 17 pages.

U.S. Notice of Allowance for U.S. Appl. No. 13/009,425 dated Jul. 18, 2014, 8 pages.

* cited by examiner

Select Journal Receiver

Physical File: FileA —— 702          Physical File Library: FileALib —— 704
Journal: FileAJrn —— 706             Journal Library: FileAJrnLib —— 708

700

| Sel | Journal Receiver | Description |
|---|---|---|
| __ | Rcvr1 | Receiver 1 Description |
| __ | Rcvr2 | Receiver 2 Description |
| __ | Rcvr3 | Receiver 3 Description |
| __ | Rcvr4 | Receiver 4 Description |
| __ | Rcvr5 | Receiver 5 Description |

710 (header brace), 712 (Sel column brace)

F3=Exit    F12=Cancel

FIG. 7

Journal Receiver Parameters

Journal Receiver: Rcvr1 —— 802
Starting Seq. Number: 0000000 —— 804
Ending Seq. Number: 1000000 —— 806
Start Time: 0800 —— 808
Start Date: 01262010 —— 810
End Time: 1300 —— 812
End Date: 02012010 —— 814

Job Details
Job Name: Job1 —— 816
Job User: User1 —— 818
Job Number: 001001 —— 820
Journal Code: FR —— 822
Journal Entry Type: *ALL —— 824

F3=Exit    F12=Cancel

| Program Name | | | | | | Date |
| --- | --- | --- | --- | --- | --- | --- |
| User | | | | | | Time |

Journal Report

---

Physical File : <u>ORDER</u> — 902   Physical File Library : <u>SJADH4001</u> — 904
Journal Object : <u>TESTJRN</u> — 906   Journal Object Library : <u>SJADH4001</u> — 908

Mode of Operation: Update — 909

910 { Before Image      Audit Information

| Order Number | Order Status | USER | PROGRAM | JOB | DATE | TIME |
| --- | --- | --- | --- | --- | --- | --- |
| PO54620 | P — 916 | SJADH400 | EZXFR001 | UPDJOB | 20 APR 2010 | 13:20:45 |

912 { After Image      Audit Information

| Order Number | Order Status | USER | PROGRAM | JOB | DATE | TIME |
| --- | --- | --- | --- | --- | --- | --- |
| PO54620 | C — 914 | SJADH400 | EZXFR001 | UPDJOB | 20 APR 2010 | 13:20:46 |

F3=Exit F12=Cancel

FIG. 9

Enter File Details

Physical File: _____ 1102

Library: _____ 1104

F3=Exit    F12=Cancel

FIG. 11

Edit Journal Receivers — 1200

Physical File: FileA — 1202
Journal: FileAJrn — 1206

Physical File Library: FileALib — 1204
Journal Library: FileAJrnLib — 1208

Select Option, Press Enter
U=Update D=Delete S=Display — 1209

1210

| Sel | Journal Receiver | Description |
|---|---|---|
| _ | Rcvr1 | Receiver 1 Description |
| _ | Rcvr2 | Receiver 2 Description |
| _ | Rcvr3 | Receiver 3 Description |
| _ | Rcvr4 | Receiver 4 Description |
| _ | Rcvr5 | Receiver 5 Description |

1212

F3=Exit   F12=Cancel   F6=Add — 1214

FIG. 12

Add Journal Receiver — 1300

Physical File: FileA — 1302
Journal: FileAJrn — 1306

Physical File Library: FileALib — 1304
Journal Library: FileAJrnLib — 1308

Journal Receiver: _____ 1310
Library: _____ 1312
Description: _____ 1314

F3=Exit    F13=Cancel

FIG. 13

JOURNALING TOOL

CROSS-REFERENCE TO RELATED APPLICATION

This application is a continuation (and claims the benefit of priority under 35 USC 120) of U.S. application Ser. No. 13/009,425, filed Jan. 19, 2011, now allowed, which is incorporated by reference.

FIELD

This disclosure relates to journaling technology.

BACKGROUND

Servers may be used to manage files related to a company's business. Several different applications may run on the servers and make changes to files stored in a database. The servers may track changes made to the files to confirm that the applications are operating properly and the files are not being corrupted.

SUMMARY

In one aspect, a computer system includes at least one processor and at least one memory coupled to the at least one processor having stored thereon instructions which, when executed by the at least one processor, causes the at least one processor to implement a tool that performs operations. The operations include causing, by the tool that is separate from a journaling process executed by a server system, display of an interface that enables user selection of information derivable from journaling data collected by the journaling process. The journaling process is configured to record, in a journal receiver, changes made to physical files stored at the server system. The operations also include receiving, at the tool and through the displayed interface, user input selecting desired information derivable from the journaling data collected by the journaling process and, based on the user input selecting the desired information derivable from the journaling data collected by the journaling process, determining, by the tool, one or more commands that are understood by the journaling process and that control the journaling process to retrieve journaling data needed to derive the desired information. The operations further include controlling, by the tool, the journaling process to execute the one or more commands, accessing, by the tool, journaling data retrieved through execution of the one or more commands, reformatting, by the tool, the accessed journaling data into a presentable format of the desired information, and causing, by the tool, display of the presentable format of the desired information.

Implementations may include one or more of the following features. For example, the operations may include determining, by the tool, multiple commands that are understood by the journaling process and that control the journaling process to retrieve journaling data needed to derive the desired information and controlling, by the tool, the journaling process to execute each of the multiple commands. In this example, the operations may include accessing, by the tool, journaling data retrieved through execution of each of the multiple commands and combining the journaling data retrieved through execution of each of the multiple commands into a report.

In some implementations, the operations may include determining, by the tool, multiple commands that are understood by the journaling process and that control the journaling process to retrieve journaling data needed to derive the desired information and controlling, by the tool, the journaling process to execute each of the multiple commands. In these implementations, the operations may include accessing, by the tool, journaling data retrieved through execution of each of the multiple commands, processing the journaling data retrieved through execution of each of the multiple commands to derive additional information that is not directly recorded by the journaling process, and formatting the derived additional information for presentation.

In addition, the operations may include accessing, by the tool, journaling data that is directly recorded by the journaling process and converting the journaling data that is directly recorded by the journaling process into a presentable format. The operations may include accessing, by the tool, different types of journaling data recorded by the journaling process, deriving the desired information from the different types of journaling data recorded by the journaling process, and formatting the derived desired information for presentation.

Further, the operations may include receiving selection data defining file identification information for the desired information and a time range for the desired information and, based on the selection data, determining, by the tool, one or more commands that retrieve data recorded, during the time range, for files identified by the file identification information. The operations may include validating the user input selecting the desired information derivable from the journaling data collected by the journaling process and, after validating the user input, determining parameters for the one or more commands that are understood by the journaling process. The operations may include passing the determined parameters to the journaling process as parameters for the one or more commands.

In some examples, the operations may include reformatting, by the tool, the accessed journaling data into a report of audit information. In these examples, the operations may include including, in a single report, a before image of audit information for the accessed journaling data and an after image of audit information for the accessed journaling data.

In some implementations, the operations may include causing display of an interface that enables user selection of parameters that define a batch job that retrieves journaling data in batch fashion and receiving user input selecting parameters that define a batch job that retrieves journaling data in batch fashion. In these implementations, the operations may include determining, by the tool, a series of multiple commands that are understood by the journaling process and that control the journaling process to retrieve all of the journaling data needed by the batch job and automatically, without human intervention, controlling the journaling process to execute the series of multiple commands.

The operations may include causing display of a file details screen that enables user entry of input object information including a file name and a library and receiving user input entering input object information including a file name and a library. The operations also may include determining, by the tool, one or more commands needed to retrieve journaling data for the entered input object information and controlling the journaling process to execute the one or more commands needed to retrieve journaling data for the entered input object information.

In some examples, the operations may include causing display of a select journal receiver screen that displays multiple journal receivers associated with a given journal and enables user selection of at least one of the multiple journal receivers associated with the given journal and receiving user input selecting, from among the multiple journal receivers associated with the given journal, a journal receiver. In these examples, the operations may include determining, by the tool, one or more commands needed to retrieve journaling data from the selected journal receiver and controlling the journaling process to execute the one or more commands needed to retrieve journaling data from the selected journal receiver.

In some implementations, the operations may include receiving, by the tool, user input selecting a journal maintenance option for a given journal and, based on receiving user input selecting the journal maintenance option for the given journal, identifying, by the tool, multiple journal receivers that have been entered for the given journal. In these implementations, the operations may include causing, by the tool, display of a maintenance interface that presents the multiple journal receivers that have been entered for the given journal and enables a user to add a new journal receiver for the given journal, update one or more of the multiple journal receivers, and delete one or more of the multiple journal receivers.

The operations may include receiving, at the tool and through the maintenance interface, user input defining a new journal receiver for the given journal and, in response to the user input defining the new journal receiver for the given journal, adding the new journal receiver for the given journal. The operations also may include receiving, at the tool and through the maintenance interface, user input to delete a particular journal receiver included in the multiple journal receivers that have been entered for the given journal and, in response to the user input to delete the particular journal receiver, deleting the particular journal receiver. The operations further may include receiving, at the tool and through the maintenance interface, user input to update a particular journal receiver included in the multiple journal receivers that have been entered for the given journal and, in response to the user input to update the particular journal receiver, updating the particular journal receiver.

In some examples, the operations may include monitoring, over time by the tool, journaling data collected by the journaling process and, based on the monitoring, analyzing, by the tool, the journaling data collected by the journaling process to detect potential issues with usage of physical files stored at the server system. In these examples, the operations may include providing, by the tool, output that is descriptive of potential issues detected based on the analysis. Further, in these examples, the operations may include monitoring, over time by the tool, journaling data to identify entries in the journaling data that indicate users that have accessed physical files stored at the server system and analyzing, by the tool, the identified entries in the journaling data to detect whether an unauthorized user has been accessing physical files stored at the server system.

In another aspect, a method includes causing, by a tool that is separate from a journaling process executed by a server system, display of an interface that enables user selection of information derivable from journaling data collected by the journaling process. The journaling process is configured to record, in a journal receiver, changes made to physical files stored at the server system. The method also includes receiving, at the tool and through the displayed interface, user input selecting desired information derivable from the journaling data collected by the journaling process and, based on the user input selecting the desired information derivable from the journaling data collected by the journaling process, determining, by the tool, one or more commands that are understood by the journaling process and that control the journaling process to retrieve journaling data needed to derive the desired information. The method further includes controlling, by the tool, the journaling process to execute the one or more commands, accessing, by the tool, journaling data retrieved through execution of the one or more commands, reformatting, by the tool, the accessed journaling data into a presentable format of the desired information, and causing, by the tool, display of the presentable format of the desired information.

In yet another aspect, at least one computer-readable storage medium is encoded with executable instructions that, when executed by at least one processor, cause the at least one processor to perform operations. The operations include causing, by the tool that is separate from a journaling process executed by a server system, display of an interface that enables user selection of information derivable from journaling data collected by the journaling process. The journaling process is configured to record, in a journal receiver, changes made to physical files stored at the server system. The operations also include receiving, at the tool and through the displayed interface, user input selecting desired information derivable from the journaling data collected by the journaling process and, based on the user input selecting the desired information derivable from the journaling data collected by the journaling process, determining, by the tool, one or more commands that are understood by the journaling process and that control the journaling process to retrieve journaling data needed to derive the desired information. The operations further include controlling, by the tool, the journaling process to execute the one or more commands, accessing, by the tool, journaling data retrieved through execution of the one or more commands, reformatting, by the tool, the accessed journaling data into a presentable format of the desired information, and causing, by the tool, display of the presentable format of the desired information.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 4-14 are diagrams of exemplary user interfaces.
Like reference numbers represent corresponding parts throughout.

DETAILED DESCRIPTION

In some implementations, a journaling process records changes made to a physical file in an object called a journal receiver. The changes are recorded as journal entries and create a path that may be followed to revert back to a prior version of the file. In these implementations, a journaling tool automates operations involved in controlling the journaling process and provides a simplified interface that abstracts out details of the journal entries to facilitate use of the journal entries in auditing file changes.

Figure 1:
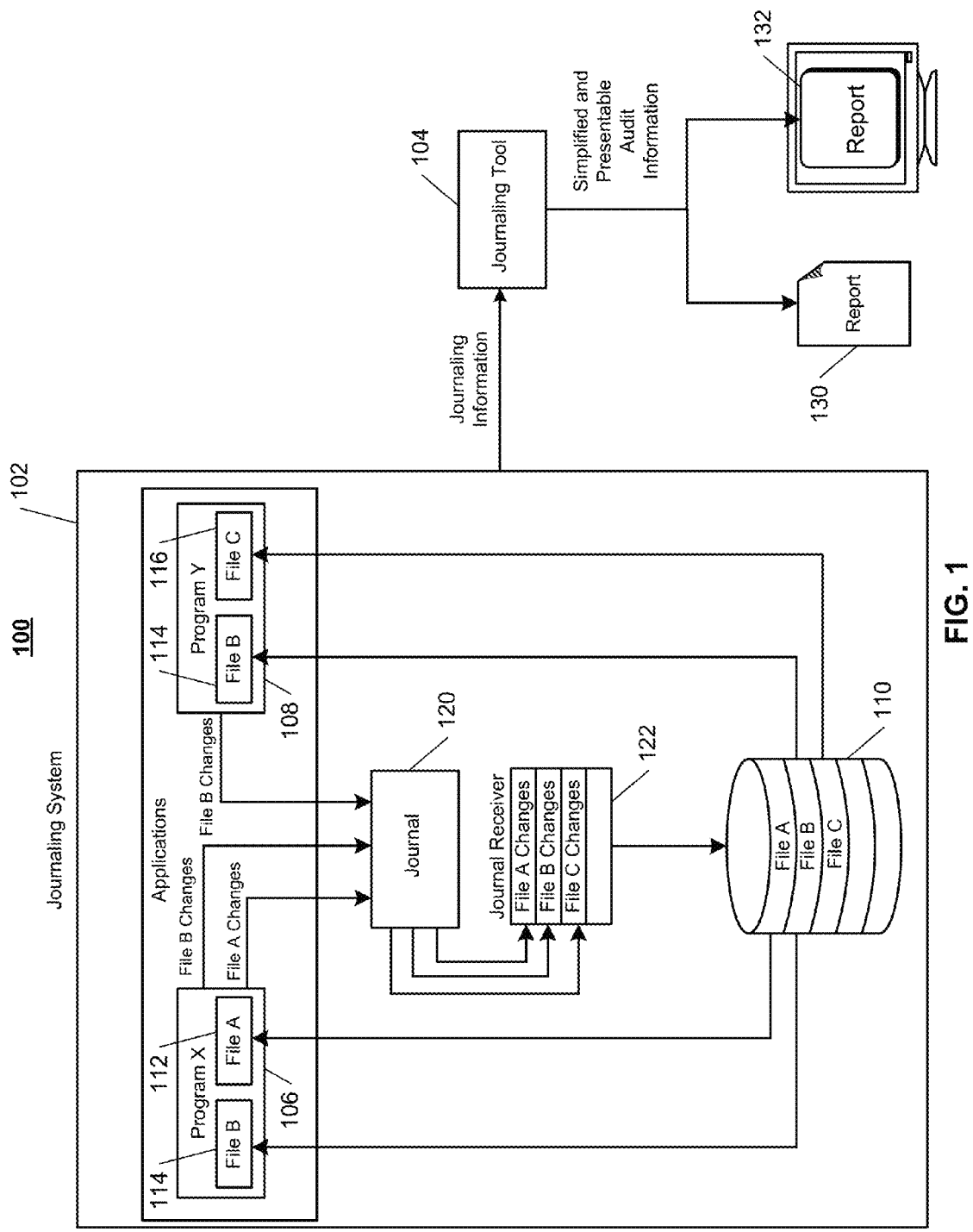
FIGS. 1, 2, and 16 are diagrams of exemplary systems.

FIG. 1 illustrates a system 100 for reformatting accessed journaling data into a presentable format. The system 100 includes a journaling system 102 and a journaling tool 104. Business applications may run on the journaling system 102. For example, a program "X" 106 and a program "Y" 108 run on the journaling system 102. Program X 106 and program Y 108 may each operate on one or more files stored in a auxiliary storage 110 of the journaling system 102. For example, program X 106 may operate on a file "A" 112 and on a file "B" 114 and program Y 108 may operate on the file "B" 114 and on a file "C" 116.

Various problems may occur during the running of program X 106 and/or program Y 108. For example, program X 106 or program Y 108 may encounter an error condition, may "crash", may experience data loss, may encounter a corrupted file or data set, may produce incorrectly calculated data, or may encounter unauthorized access to data. Problems in the running of a program are often caused by updates to a data file used by the program (e.g., updates performed by the program or updates performed by another program, another system, or by a user).

To investigate problems, an analyst may analyze journaling data captured by a journal 120. The journal 120 may be used to record activity related to physical files (e.g., files 112, 114, and 116). For example, activities such as the opening of a file, the closing of a file, the adding of a new record or other information to a file, the deleting of a record or other information from a file, or the updating of a record or other information in a file may be recorded using the journal 120. In response to activity associated with a file, a journal entry may be made.

Journal entries may be made in an associated journal receiver. For example, a journal receiver 122 may be associated with the journal 120. A journal may be associated with a journal receiver when the journal is created. A journal may serve one or more files. A command may be issued to associate a journal with a file and to enable journaling for the associated file.

The journal 120 may be used to connect the journal receiver 122 to one or more of the files 112, 114, and 116. Although in the example of FIG. 1, the journal receiver 122 stores data for the multiple files 112, 114, and 116, in some uses, a separate journal receiver may be used for each file 112, 114, and 116. Once journaling is enabled for a file, the system may record in a journal entry in a journal receiver a copy of any record added, updated or deleted from the file, and also may record information related to other file activity, such as file-open and file-close activities. Journaling can be configured to record a copy of a record before it is changed and/or to record a copy of the record after it is changed.

A journal entry may also include, for example, a job name, program name, and/or user name of an initiator of file activity that triggered the journal entry. For example, if program X 106 causes a change to file 114, a journal entry stored in the journal receiver 122 may include details describing the change in file data and also an indication that program X 106 was the cause of the data change.

The journal 120 and the journal receiver 122 may be stored as objects in the journaling system 102. For example, the journal 120 and the journal receiver 122 may be stored in the auxiliary storage 110 or in another datastore. Journal receivers may exist in the same logical library as an associated file. A journal may be stored in the same logical library as an associated journal receiver. In some implementations, the journal receiver 122 is stored in a different datastore than the auxiliary storage 110 used to store the files 112, 114, and 116. For example, the journal receiver 122 may be stored in a different datastore than the auxiliary storage 110 used to store the files 112, 114, and 116 so that, in the case that the auxiliary storage 110 is corrupted, the journal receiver 122 stored in another datastore may be still be analyzed to determine the cause of the data corruption.

The journaling system 102 may include a command to display information included in a journal receiver. However, the information stored in the journal receiver may be encrypted, compressed, stored in a binary or hexadecimal format, or may otherwise not be presentable or displayable in a human-readable form. The journaling tool 104 may be used to display journaling data in a presentable format.

For example and as described in more detail below, the journaling tool 104 may be used to enable a user to select information derivable from journaling data collected by the journaling system 102. The journaling tool 104 may determine one or more commands that are understood by the journaling system 102 and that control the journal 120 and/or the journal receiver 122 to retrieve journaling data used to derive the information desired by the user. The journaling tool 104 may control the journal 120 and/or the journal receiver 122 to execute the determined commands and may access journaling data retrieved through execution of the commands. In some implementations, the determined commands are executed by a batch process. The journaling tool 104 may reformat the accessed journaling data into a presentable format of the user-desired information and may display the presentable format of the user-desired information, such as on a printed report 130 or on an on-screen report 132. The on-screen report 132 may be stored in a data store.

Figure 2:
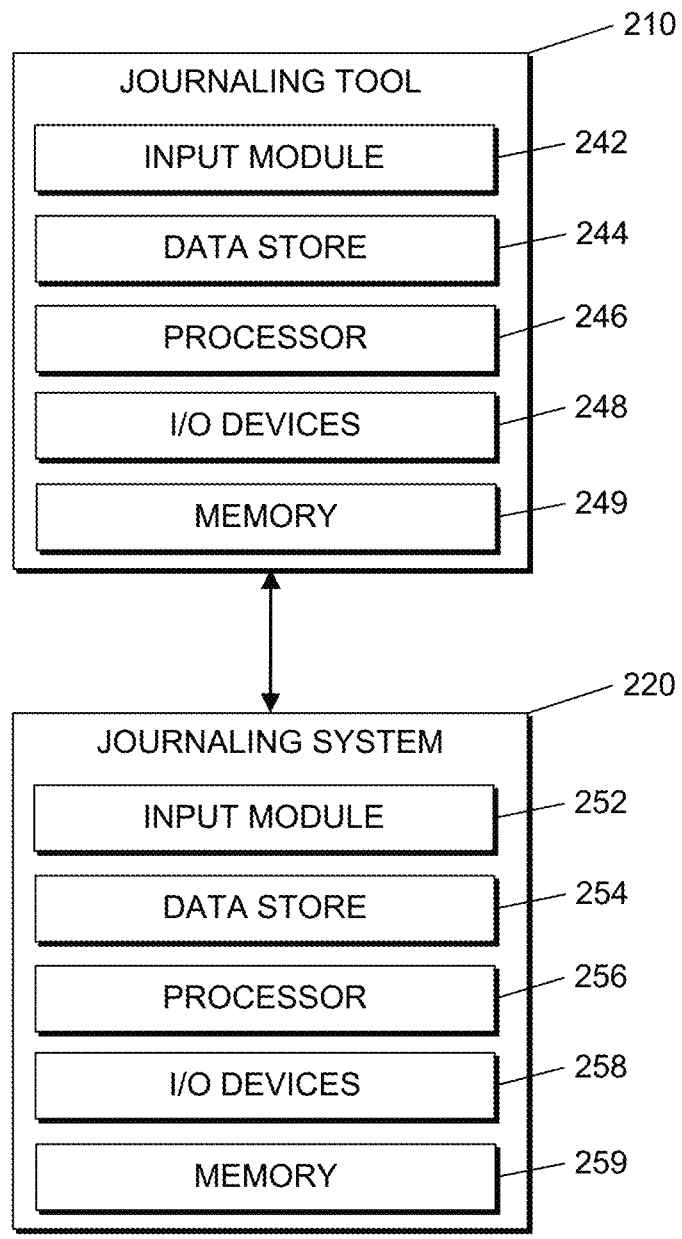

FIG. 2 illustrates an exemplary system 200 for reformatting accessed journaling data into a presentable format. The system 200 includes a journaling tool 210 and a journaling system 220. The journaling tool 210 includes an input module 242, a data store 244, one or more processors 246, one or more I/O (Input/Output) devices 248, and memory 249. The journaling system 220 also includes an input module 252, a data store 254, a processor 256, one or more I/O devices 258, and memory 259.

The input module 242 may be used to enable user selection of desired information derivable from journaling data collected by the journaling system 220. For example, the input module 242 may be used to receive selection data defining file identification information for the desired information and a time range for the desired information, user input selecting parameters that define a batch job that retrieves journaling data from the journaling system 220 in batch fashion, user input entering input object information including a file name and a library, or user input selecting a journal receiver from among multiple journal receivers associated with a particular journal.

The input module 252 may be used to input any type of information related to configuring journaling on the journaling system 220. The input module 252 may be used to create one or more journal objects, create one or more journal receiver objects, associate one or more journal receivers with a journal object, and associate a file with a journal, to name a few examples.

In some implementations, data from the input module 242 is stored in the data store 244. Similarly, in some implementations, data from the input module 252 is stored in the data store 254. The data included in the data store 244 may include, for example, journal reports. The data included in the data store 254 may include, for example, file data, journal objects, and journal receiver objects.

In some examples, the data store 244 and/or the data store 254 may be relational databases that logically organize data into a series of database tables. Each database table in the data store 244 and the data store 254 may arrange data in a series of columns (where each column represents an attribute of the data stored in the database) and rows (where each row represents attribute values).

In some implementations, the data store 244 and/or the data store 254 may be object-oriented databases that logically or physically organize data into a series of objects. Each object may be associated with a series of attribute values.

In some examples, the data store 244 and/or the data store 254 may be a type of database management system that is not necessarily a relational or object-oriented database. For example, a series of XML (Extensible Mark-up Language) files or documents may be used, where each XML file or document includes attributes and attribute values. Data included in the data store 244 or the data store 254 may be identified by a unique identifier such that data related to a particular process may be retrieved from the data store 244 or the data store 254. Other types of file systems may be used.

The processor 246 and the processor 256 may each be a processor suitable for the execution of a computer program such as a general or special purpose microprocessor, and any one or more processors of any kind of digital computer. In some implementations, the journaling tool 210 includes more than one processor 246. Similarly, in some implementations, the journaling system 220 includes more than one processor 256. The processor 246 may receive instructions and data from the memory 249. Similarly, the processor 256 may receive instructions and data from the memory 259. The memory 249 may store instructions and data corresponding to any or all of the components of the journaling tool 210. Similarly, the memory 259 may store instructions and data corresponding to any or all of the components of the journaling system 220. Each of the memory 249 and the memory 259 may include read-only memory, random-access memory, or both.

The I/O devices 248 are configured to provide input to and output from the journaling tool 210. Similarly, the I/O devices 258 are configured to provide input to and output from the journaling system 220. For example, each of the I/O devices 248 and I/O devices 258 may include a mouse, a keyboard, a stylus, or any other device that allows the input of data. Each of the I/O devices 248 and I/O devices 258 may also include a display, a printer, or any other device that outputs data.

The journaling tool 210 and the journaling system 220 may communicate over a network. For example, the journaling tool 210 may submit journaling commands to the journaling system 220 and may access journaling data retrieved through execution of the journaling commands. Although the journaling tool 210 and the journaling system 200 are shown as separate physical systems, in some implementations, the journaling tool 210 may be an application which runs on the journaling system 220.

In some implementations, the journaling tool 210 and the journaling system 220 both reside on the same system (e.g., the same AS/400 server system). In these implementations, the journaling tool 210 and the journaling system 220 may share components illustrated in FIG. 2 and do not require separate components for operation, as illustrated. For instance, when the journaling tool 210 and the journaling system 220 both reside on the same system, the journaling tool 210 and the journaling system 220 may share one or more input modules, one or more processors, one or more data stores, one or more I/O devices, and/or one or more memory units.

Figure 3:
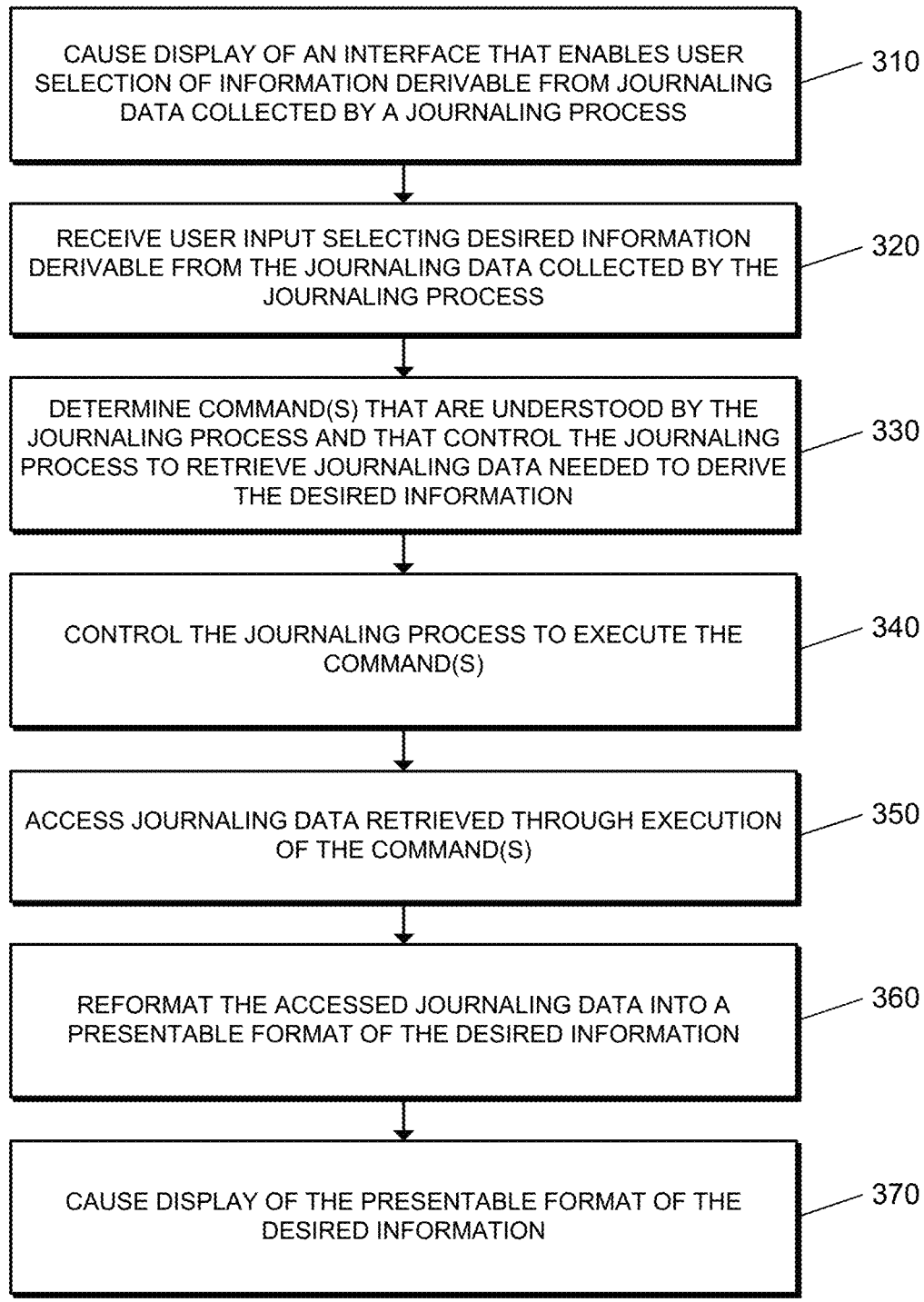
FIGS. 3 and 15 are flowcharts of exemplary processes.

FIG. 3 illustrates a process 300 for reformatting accessed journaling data into a presentable format. The operations of the process 300 are described generally as being performed by the system 200. The operations of the process 300 may be performed by one of the components of the system 200 (e.g., the journaling tool 210) or may be performed by a combination of the components of the system 200. In some implementations, operations of the process 300 may be performed by one or more processors included in one or more electronic devices.

The system 200 causes display of an interface that enables user selection of information derivable from journaling data collected by a journaling process (310). For example and as described below with respect to FIGS. 4 to 8, one or more interfaces provided by a journaling tool may be displayed, which enable the user to enter input object information including a file name and a library. The one or more interfaces also may enable the user to select one or more parameters that define a batch job that retrieves journaling data in batch fashion, to select one or more journal receivers associated with a particular journal, and/or to enter selection data defining file identification information for desired information and a time and/or date range for the desired information.

Journaling data may be collected by a journaling process executing on a journaling system which is separate from the journaling tool. Journaling data may be collected, for example, for one or more database files, where each database file is associated with a journal object, and where each journal object is associated with one or more journal receiver objects.

Figure 4:
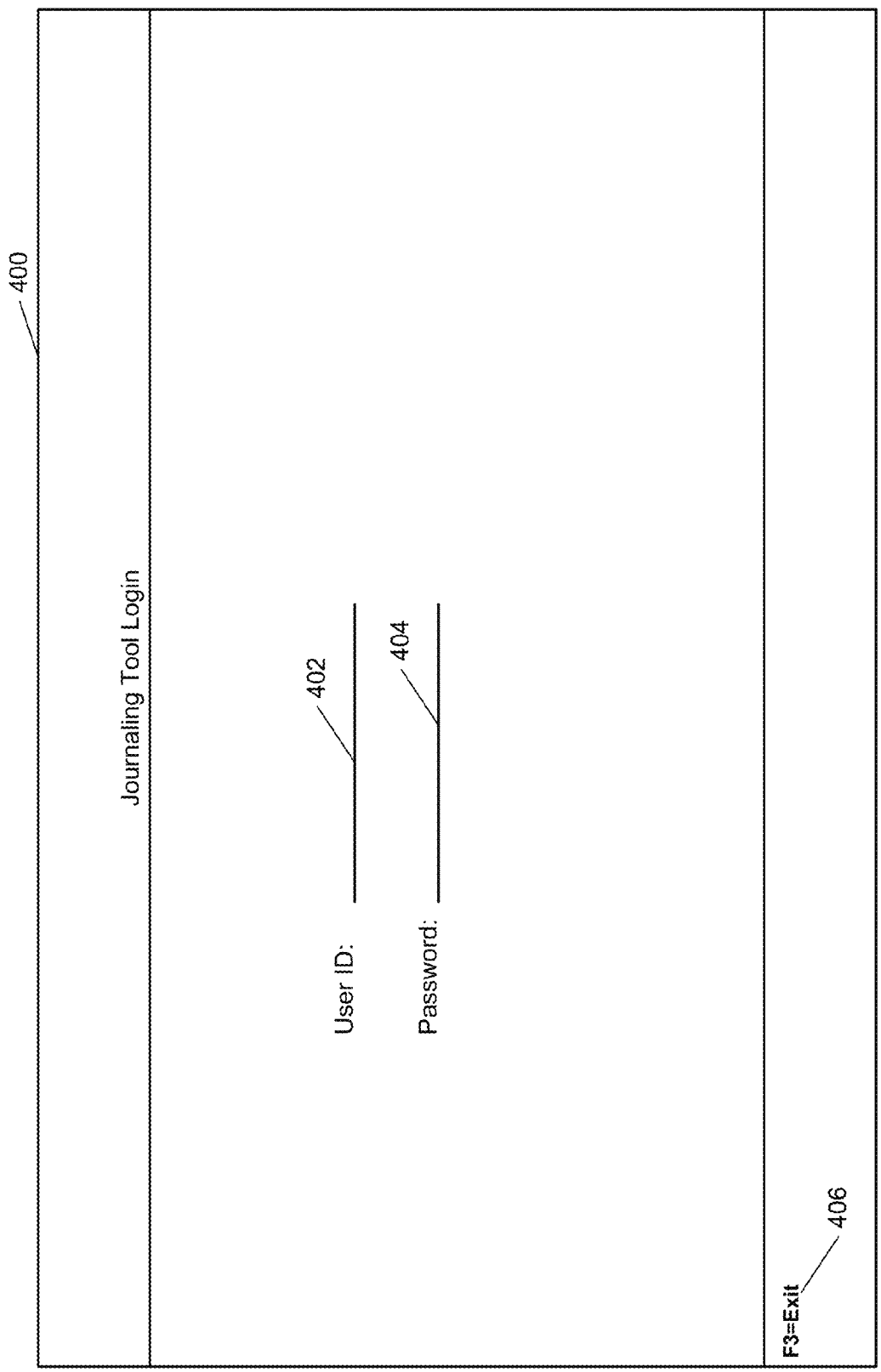

The system 200 receives user input selecting desired information derivable from the journaling data collected by the journaling process (320). For example, the system 200 may receive user input from some or all of example user interfaces 400, 500, 600, 700, and 800, described below with respect to FIGS. 4 to 8, respectively. For example, FIG. 4 illustrates the example user interface 400 which enables a user to log in to a journaling tool. The user may, for example, enter a user identifier using a field 402 and may enter a password using a field 404. The user may submit the log in information, for example, by pressing the enter key. The user may exit the user interface 400 by pressing the "F3" key, as indicated by indicator 406.

The journaling tool may validate the submitted user identifier and password. If a valid user identifier and password are submitted, the journaling tool may display the example user interface 500 illustrated in FIG. 5. The example user interface 500 displays a menu 502 which, in this example, displays extract and maintenance options. The extract option may be selected to display one or more interfaces that are used to extract journaling information associated with a particular file or journal and to view the extracted information in a presentable, user-friendly format. The maintenance option may be selected to display one or more interfaces that are used to, for example, associate a new journal receiver with a particular journal, update one or more journal receivers associated with a particular journal, and/or delete one or more journal receivers associated with a particular journal. The user may enter an option using a field 504.

Figure 5:
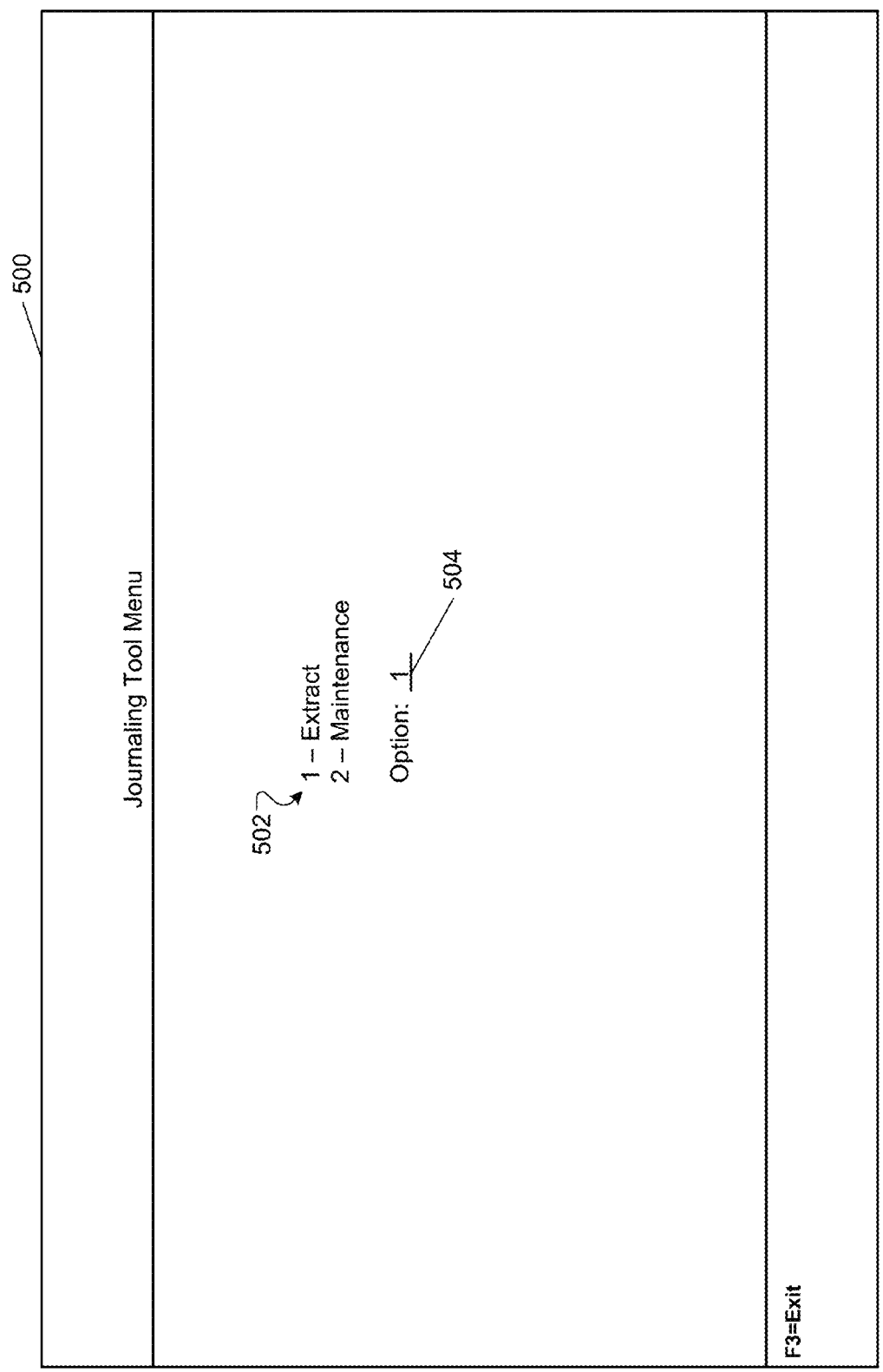
Figure 6:
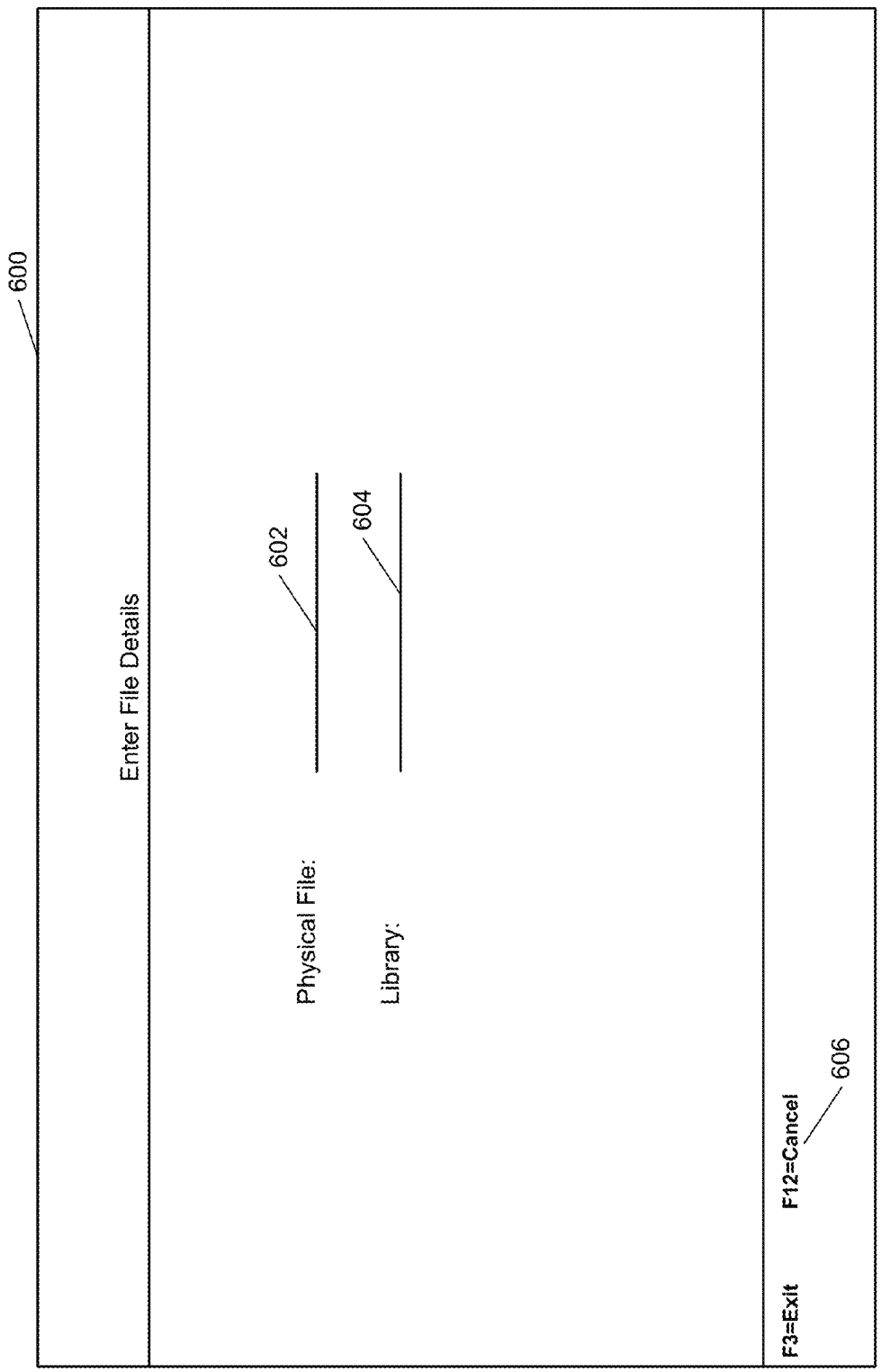

If, as shown in FIG. 5, the user enters the menu option corresponding to the extract option, the example user interface 600 illustrated in FIG. 6 may be displayed. The user interface 600 enables a user to enter input object information. For instance, using the example user interface 600, the user may enter file name information using a field 602 and corresponding library information using a field 604. The user may, as indicated by indicator 606, press the "F12" key to cancel the enter file details operation and to return to the menu interface displayed in the example user interface 500. The user may submit the file name and library information, for example, by pressing the enter key.

After submitting input object information, the example user interface 700 illustrated in FIG. 7 may be displayed. The example user interface 700 may display, such as for reference, the input object information previously entered. For example, a file name 702 and the name of a library 704 associated with the file are displayed. The example user interface 700 also displays the name of a journal 706 associated with the file and the name of a library 708 associated with the journal.

The example user interface 700 displays a list 710 of journal receivers associated with the journal 706, along with corresponding journal receiver descriptions. The user may select a journal receiver from the list 710 by using a set of selection fields 712. For example, the user may navigate (e.g., using a "tab" key) to a field 712 corresponding to a desired journal receiver and may submit the selection of the journal receiver by pressing the enter key. Other selection modes are possible. For example, the user may enter a selection character (e.g., "S") into a selection field 712 and may press the enter key to submit the selection. The user may select a particular journal receiver, for example, to extract information from the selected journal receiver.

After the selection of a journal receiver has been submitted, the example user interface 800 illustrated in FIG. 8 may be displayed. The example user interface 800 enables a user to enter values for one or more journal receiver parameters. Data may be extracted from the selected journal receiver according to the parameter values. In other words, journaling data included in the selected journal receiver which corresponds to the entered parameter values may be extracted.

The name of the previously selected journal receiver is displayed for reference in a field 802. The user may enter a starting sequence number and an ending sequence number using fields 804 and 806, respectively. Journal entries with sequence number values between the starting and ending sequence numbers may be extracted. The user may enter start time, start date, end time, and end date parameter values using fields 808, 810, 812, and 814, respectively. Journal entries having a timestamp between the starting date and time and the ending date and time may be extracted.

The user may enter a job name, job user, and job number using fields 816, 818, and 820, respectively. Journal entries associated with the entered job name, job user, or job number may be extracted. For example, a journal entry may be associated with a particular job name, job user and/or job number if, for example, a file update that triggered the journal entry was performed by a particular job.

In general, a journal entry may be described by a journal code and a journal entry type. Example journal codes may include, among other codes, "J" (journal receiver operations), "F" (file operations), "R" (record operations), and "C" (commitment control operations). Example journal entry types may include, among other types, "OP" (file open), "CL" (file close), "UP" (record update), "DL" (record delete), "PT" (new record written), "BC" (begin commitment control), "SC" (start commit cycle), and "RB" (rollback operation).

The user may enter one or more journal codes using a field 822 and one or more journal entry types using a field 824. Journal entries having a journal code matching one or more of the entered journal codes or journal entries having a journal entry type matching one or more of the entered journal entry types may be extracted. The user may enter specific journal codes or journal entry types, or may specify a wildcard setting (e.g., "*ALL") indicating a desire to match any journal code or journal entry type.

The parameter values entered using the example user interface 800 may be submitted as parameters (or may be mapped to other parameters) used in a batch job to extract journaling data. In some implementations, if multiple parameter values are entered, journaling data matching all of the parameter values is extracted (e.g., multiple parameter matching conditions may be processed as if logical "AND" operators are connecting the conditions). In some implementations, if multiple parameter values are entered, journaling data matching any of the parameter values is extracted (e.g., multiple parameter matching conditions may be processed as if logical "OR" operators are connecting the conditions). In some implementations, a combination of different types of Boolean operators may be associated with the entered parameter values.

Returning to FIG. 3, the system 200 determines command(s) that are understood by the journaling process and that control the journaling process to retrieve journaling data needed to derive the desired information (330). The commands may be determined, for example, based on the user input selecting the desired information derivable from the journaling data collected by the journaling process.

For some user inputs, one command may be determined. For other user inputs, multiple commands may be determined. If the user input includes file identification information for the desired information and a time range for the desired information, one or more commands may be determined that retrieve data recorded during the time range, for files identified by the file identification information.

If the user input includes parameters that define a batch job that retrieves journaling data in batch fashion, a series of multiple commands that are understood by the journaling process and that control the journaling process to retrieve all of the journaling data needed by the batch job may be determined. If the user input includes input object information, one or more commands needed to retrieve journaling data for the entered input object information may be determined. If the user input includes a selection of a journal receiver, one or more commands needed to retrieve journaling data from the selected journal receiver may be determined.

Some user inputs may be validated (e.g., a list of journal codes may be validated to ensure that valid journal codes are included). After validating user input, one or more command parameters may be determined for the one or more commands that are understood by the journaling process.

The system 200 controls the journaling process to execute the command(s) (340). If one command was determined, a journaling process may be controlled by a journaling tool to execute the command. If multiple commands were determined, the journaling process may be controlled by a journaling tool to execute each of the multiple commands. If one or more command parameters were determined, the determined parameters may be passed to the journaling process as parameters for one or more commands.

If a series of commands that control the journaling process to retrieve all of the journaling data needed by a batch job were determined, the system 200 may automatically, without human intervention, control the journaling process to execute the series of multiple commands. If one or more commands needed to retrieve journaling data for entered input object information were determined, the system 200 may control the journaling process to execute the one or more commands needed to retrieve journaling data for the entered input object information. If one or more commands needed to retrieve journaling data from a selected journal receiver were determined, the system 200 may control the journaling process to execute the one or more commands needed to retrieve journaling data from the selected journal receiver.

The system 200 accesses journaling data retrieved through execution of the command(s) (350). For example, a journaling tool may access journaling data that is directly recorded by the journaling process. As another example, the journaling tool may access journaling data retrieved through execution of one command or execution of each of multiple commands. As yet another example, the journaling tool may access different types of journaling data recorded by the journaling process. For example, different types of journal entries may be accessed, such as journal entries having different journal codes and/or different journal entry types.

The system reformats the accessed journaling data into a presentable format of the desired information (360). For example, the system 200 may convert journaling data that is directly recorded by the journaling process into a presentable format. As another example, if multiple commands were executed, the system 200 may combine the journaling data retrieved through execution of each of the multiple commands into a report. If different types of journaling data were accessed, the system 200 may derive the desired information from the different types of journaling data and may format the derived desired information for presentation.

As another example, the system 200 may process the journaling data retrieved through execution of each of the multiple commands to derive additional information that is not directly recorded by the journaling process and may format the derived additional information for presentation. As a more specific example, the system 200 may calculate one or more statistics based on the retrieved journaling data, or the system 200 may look up presentation names of one or more objects (e.g., user name, job name) based on one or more object identifiers included in the retrieved journaling data. The system 200 may look up additional information based on one or more identifiers included in the retrieved journaling data. For example, the retrieved journaling data may include an order number, and the system 200 may retrieve additional, related order information, such as order status, order date, or other order-related information, from a data source which includes order information.

The system 200 may reformat the accessed journaling data into a report of audit information. For example, a journaling tool may include, in a single report, a before image of audit information for the accessed journaling data and an after image of audit information for the accessed journaling data. The before image may, for example, include an image of a data record before a record update and the after image may include an image of the data record after the record update.

The system 200 causes display of the presentable format of the desired information (370). For example, a report may be displayed. FIG. 9 illustrates an example journal report 900. The example journal report 900 displays a file name 902 and the name of a library 904 associated with the file. The example journal report 900 also displays the name of a journal 906 associated with the file and the name of a library 908 associated with the journal.

The example journal report 900 includes a mode of operation description 909. The mode of operation description 909 may be displayed based on one or more journal codes included in the journaling data used as a basis for the example journal report 900. The example journal report 900 may include other descriptive information which is derived from one or more journal codes and/or one or more journal entry types included in accessed journaling data.

The example journal report 900 includes a before image 910 and an after image 912. The before image 910 may, for example, include an image of a data record before a record update and the after image 912 may include an image of the data record after the record update. For example, an order status 914 (i.e., cancelled) included in the after image 912 is a different status than an order status 916 (i.e., pending) included in the before image 910.

The before image 910 and the after image 912 also include order number information and audit information which includes user, program, job, date, and time information. The information included in the before image 910 and the after image 912 is displayed in a presentable, human-readable format. The accessed journaling data may have been encrypted, compressed, stored in a binary or hexadecimal format, or may have been in some other format not generally presentable. As part of generating the example journal report 900, some or all of the accessed journaling data may be reformatted to a presentable format.

Figure 10:
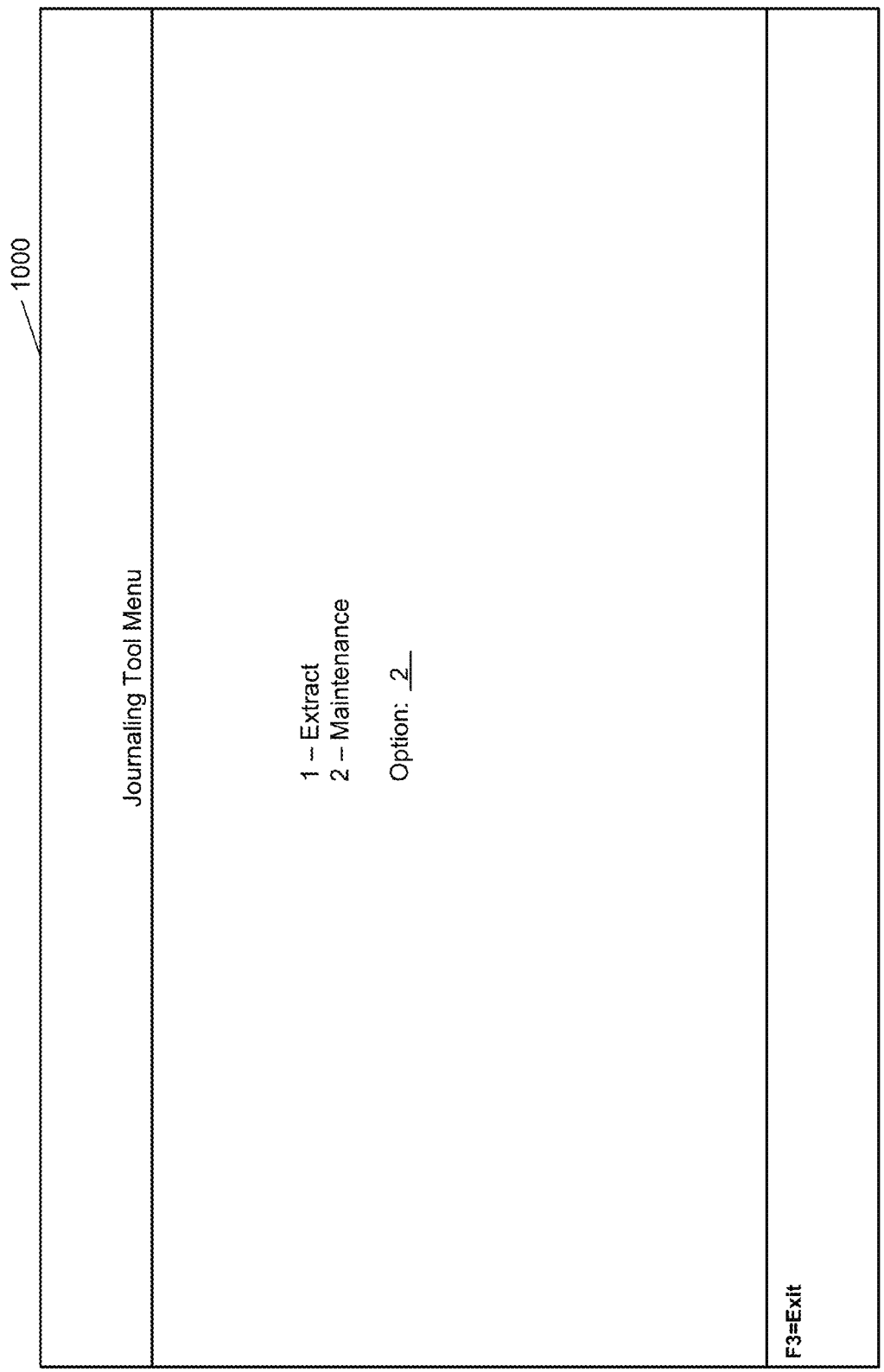

As mentioned above, a journaling tool menu (as presented in example user interface 500) may include extract and maintenance options. If, as shown in FIG. 10, a user selects a menu option corresponding to the maintenance option, an example user interface 1100 as illustrated in FIG. 11 may be displayed. Similar to the example user interface 600, the example user interface 1100 allows the user to enter input object information. For instance, using the example user interface 1100, the user may enter file name information using a field 1102 and corresponding library information using a field 1104. After submitting input object information, the example user interface 1200 illustrated in FIG. 12 may be displayed.

The example user interface 1200 may display, such as for reference, the input object information previously entered. For example, a file name 1202 and the name of a library 1204 associated with the file are displayed. The example user interface 1200 also displays the name of a journal 1206 associated with the file and the name of a library 1208 associated with the journal.

The example user interface 1200 displays a list 1210 of journal receivers associated with the journal 1206, along with corresponding journal receiver descriptions. The user may perform an action on a journal receiver in the list 1210 by entering a command in one of a set of fields 1212. For example, the user may navigate (e.g., using a "tab" key) to a field 1212 corresponding to a desired journal receiver and may enter a command in the field. As indicated by indicators 1209, the user may enter a "U" command to update a journal receiver, a "D" command to delete a journal receiver, or an "S" command to display details for a journal receiver. As indicated by indicator 1214, the user may press the "F6" key to add a new journal receiver.

If the user presses the "F6" key to add a new journal receiver, the example user interface 1300 illustrated in FIG. 13 may be displayed. The example user interface 1300 may display, such as for reference, the input object information previously entered. For example, the example user interface 1300 displays a file name 1302 and the name of a library 1304 associated with the file. The example user interface 1300 also displays the name of a journal 1306 associated with the file and the name of a library 1308 associated with the journal.

A field 1310 enables the user to enter the name of a new journal receiver to associate with the journal 1306. A field 1312 enables the user to enter a library for the new journal receiver. A field 1314 enables the user to enter a description for the new journal receiver. The user may submit the entered information, for example, by pressing the enter key.

Figure 14:
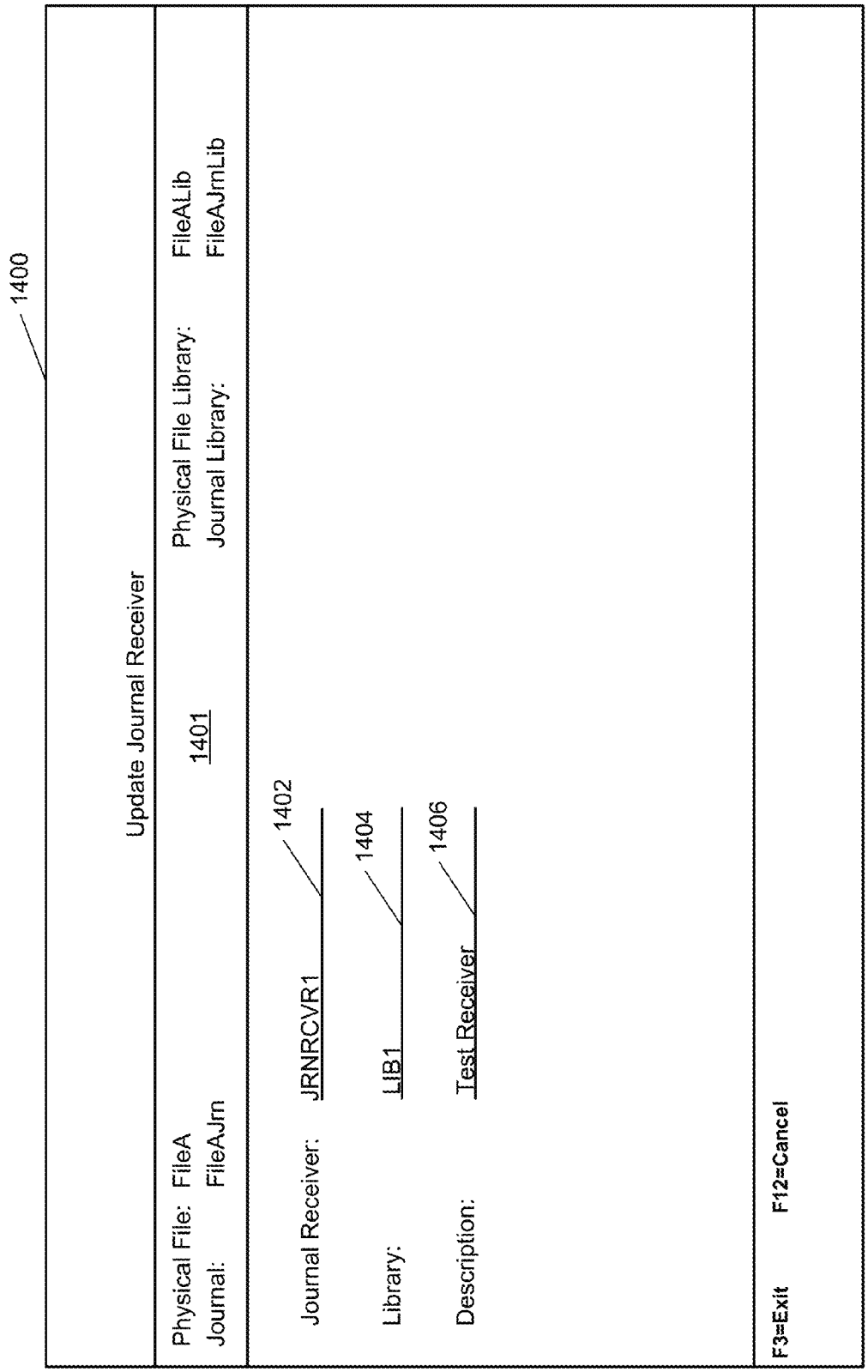

Returning to FIG. 12, if, on the example user interface 1200, the user enters a "U" command to update a particular journal receiver, the example user interface 1400 illustrated in FIG. 14 may be displayed. Similar to other example user interfaces, the example user interface 1400 displays reference information, such as a file name, journal name, and library names for the file and journal, in an area 1401.

A field 1402 enables the user to edit the name of the journal receiver. A field 1404 enables the user to edit the library of the journal receiver. A field 1406 enables the user to edit the description of the journal receiver. The user may submit the entered information, for example, by pressing the enter key.

Figure 15:
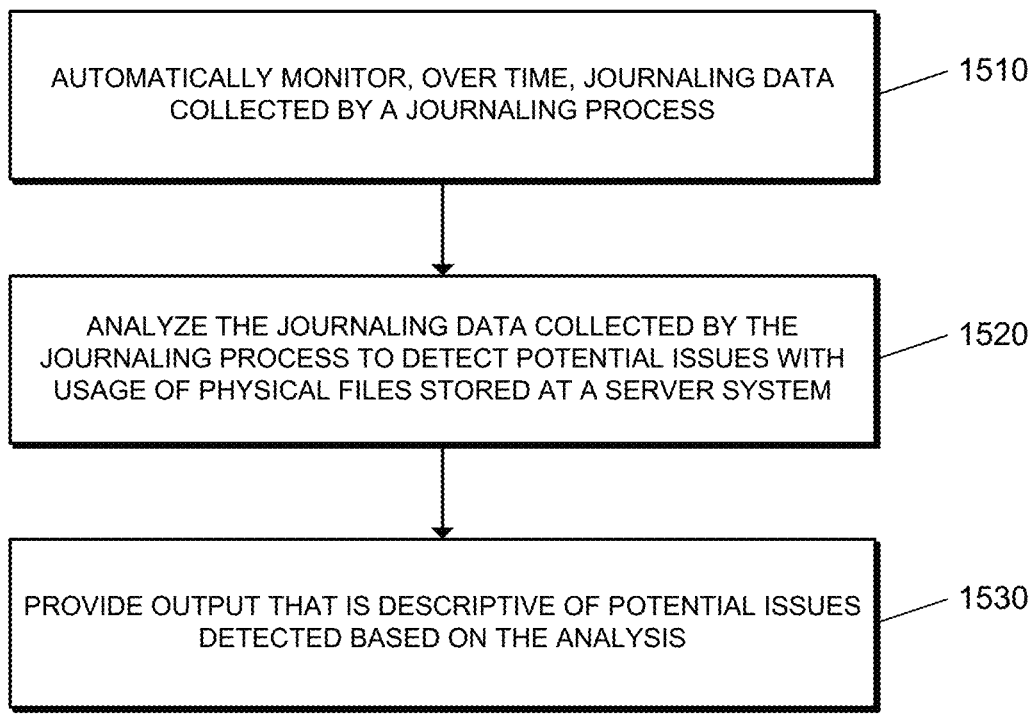

FIG. 15 illustrates a process 1500 for providing output descriptive of potential issues detected by analyzing collected journaling data. The operations of the process 1500 are described generally as being performed by the system 200. The operations of the process 1500 may be performed by one of the components of the system 200 (e.g., the journaling tool 210) or may be performed by a combination of the components of the system 200. In some implementations, operations of the process 1500 may be performed by one or more processors included in one or more electronic devices.

The system 200 automatically monitors, over time, journaling data collected by a journaling process (1510). For example, journaling data may be monitored to identify entries in the journaling data that indicate users that have accessed physical files stored at the system 200. The monitoring may occur over a period of time (e.g., a period of hours, days, weeks, months, and/or years) and the system 200 may track and store journaling data from the monitoring period.

The system 200 analyzes the journaling data collected by the journaling process to detect potential issues with usage of physical files stored at a server system (1520). For example, journaling data may be analyzed to detect whether an unauthorized user has been accessing physical files stored at the system 200.

The system 200 provides output that is descriptive of potential issues detected based on the analysis (1530). For example, a report may be provided, which displays information describing activities performed against physical files by unauthorized users.

Figure 16:
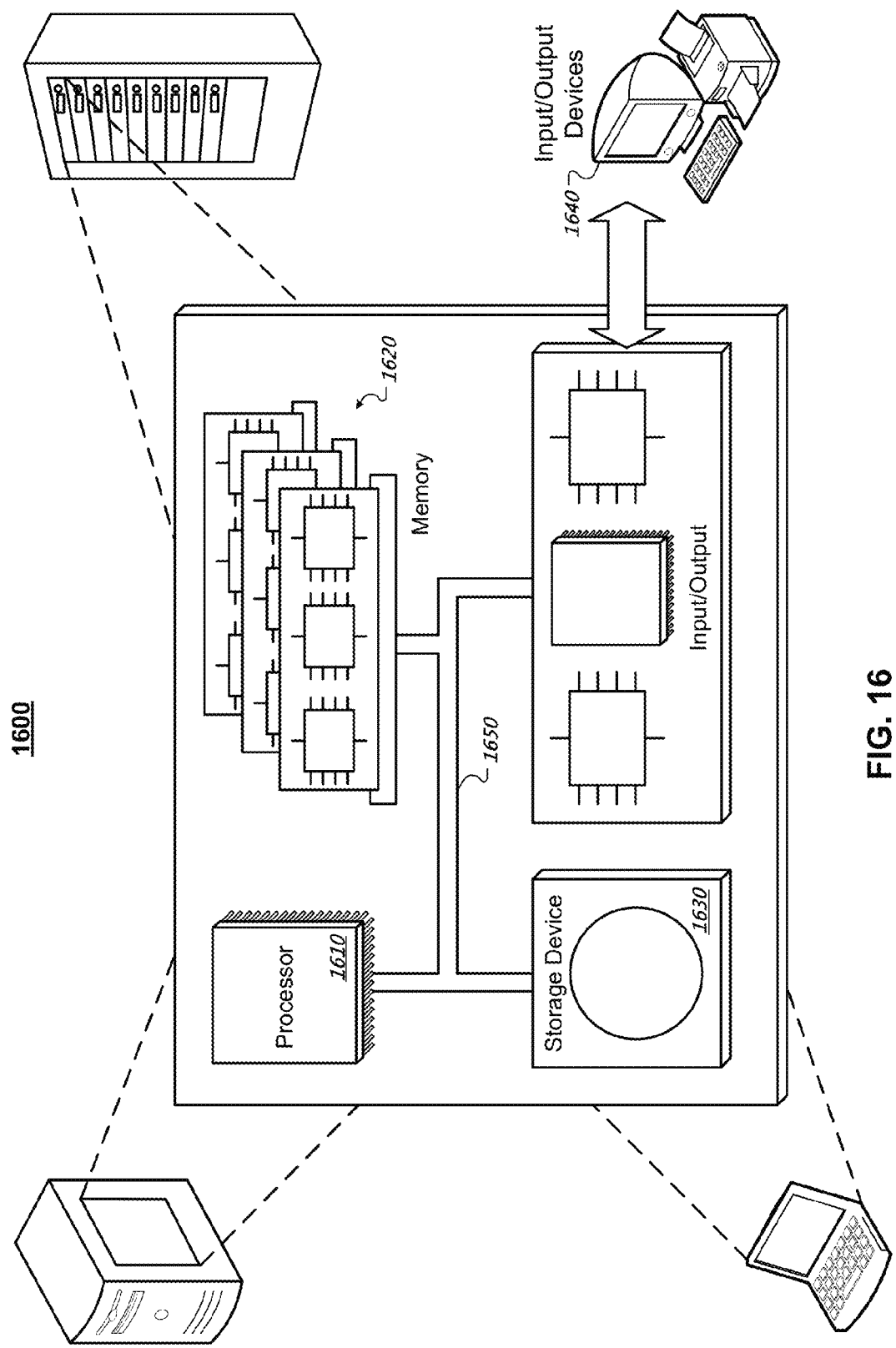

FIG. 16 is a schematic diagram of an example of a generic computer system 1600. The system 1600 can be used for the operations described in association with the processes 300 and 1500, according to one implementation. For example, the system 1600 may be included in either or all of the journaling tool 210 and the journaling system 220.

The system 1600 includes a processor 1610, a memory 1620, a storage device 1630, and an input/output device 1640. Each of the components 1610, 1620, 1630, and 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In one implementation, the memory 1620 is a computer-readable medium. In one implementation, the memory 1620 is a volatile memory unit. In another implementation, the memory 1620 is a non-volatile memory unit.

The storage device 1630 is capable of providing mass storage for the system 1600. In one implementation, the storage device 1630 is a computer-readable medium. In various different implementations, the storage device 1630 may be a floppy disk device, a hard disk device, an optical disk device, or a tape device.

The input/output device 1640 provides input/output operations for the system 1600. In one implementation, the input/output device 1640 includes a keyboard and/or pointing device. In another implementation, the input/output device 1640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method comprising:
providing, by an electronic device and for display, a first interface that includes information derivable from journaling data collected by a journaling process,
the journaling process being configured to record changes made to physical files;
receiving, by the electronic device and via the first interface, a selection of information to be displayed by the electronic device,
the selected information including information that is not directly recorded by the journaling process and the information that is derivable from the journaling data collected by the journaling process;
determining, by the electronic device and based on the selected information, multiple sequential commands that are understood by the journaling process and that each control the journaling process to retrieve journaling data that derives the selected information;
controlling, by the electronic device, the journaling process to execute each of the multiple sequential commands;
accessing, by the electronic device, journaling data retrieved through execution of each of the multiple sequential commands;
deriving, by the electronic device and from the accessed journaling data, additional information that is not directly recorded by the journaling process and that includes information about the changes made to the physical files;
including, by the electronic device, the additional information in a report by reformatting the accessed journaling data,
the report including a before image of audit information for the accessed journaling data and an after image of audit information for the accessed journaling data, and
the before image and the after image providing an indication of the changes made to the physical files; and
providing, by the electronic device and for display on a display screen, a second interface that includes the report with the additional information and that simultaneously includes, on the display screen, the before image and the after image.

2. The method of claim 1, where determining, by the electronic device and based on the selected information, multiple sequential commands that are understood by the journaling process and that each control the journaling process to retrieve journaling data that derives the selected information, comprises:
determining a set of journaling data needed to derive the selected information; and
generating multiple sequential commands to retrieve the set of journaling data as the determined multiple sequential commands.

3. The method of claim 2, where the set of journaling data comprises journaling data associated with a particular time period.

4. The method of claim 2, where the set of journaling data comprises journaling data associated with one or more particular journal entry types corresponding to different operations.

5. The method of claim 2, where the set of journaling data comprises journaling data associated with a particular file.

6. The method of claim 1, where the selected information includes file identification information and a time range.

7. The method of claim 1, further comprising:
validating the selected information.

8. The method of claim 1, where controlling, by the electronic device, the journaling process to execute each of the multiple sequential commands, comprises:
controlling, by the electronic device, the journaling process to iteratively execute in sequence the multiple sequential commands.

9. An electronic device, comprising:
one or more processors to:
provide, for display, a first interface that includes information derivable from journaling data collected by a journaling process,
the journaling process being configured to record changes made to physical files;
receive, via the first interface, a selection of information to be displayed by the electronic device,
the selected information including information that is not directly recorded by the journaling process and the information that is derivable from the journaling data collected by the journaling process;
determine, based on the selected information, multiple commands that are understood by the journaling process and that each control the journaling process to retrieve journaling data that derives the selected information;
control the journaling process to execute each of the multiple commands and to retrieve journaling data;
derive, from the retrieved journaling data, additional information that is not directly recorded by the journaling process and that includes information about the changes made to the physical files;
include the additional information in a report by reformatting the retrieved journaling data, the report including a before image associated with the retrieved journaling data and an after image associated with the retrieved journaling data, and the before image and the after image providing an indication of the changes made to the physical files; and provide, for display on a display screen, a second interface that includes the report with the additional information and that simultaneously includes, on the display screen, the before image and the after image.

10. The electronic device of claim 9, where, when determining, based on the selected information, multiple sequential commands that are understood by the journaling process and that each control the journaling process to retrieve journaling data that derives the selected information, the one or more processors are further to:

determine a set of journaling data needed to derive the selected information; and generate multiple sequential commands to retrieve the set of journaling data as the determined multiple sequential commands.

11. The electronic device of claim 10, where the set of journaling data comprises journaling data associated with a particular time period.

12. The electronic device of claim 10, where the set of journaling data comprises journaling data associated with one or more particular journal entry types corresponding to different operations.

13. The electronic device of claim 10, where the set of journaling data comprises journaling data associated with a particular file.

14. The electronic device of claim 9, where the selected information includes file identification information and a time range.

15. The electronic device of claim 9, where the one or more processors are further to:

validate the selected information.

16. The electronic device of claim 9, where, when controlling the journaling process to execute each of the multiple commands, the one or more processors are further to:

control the journaling process to iteratively execute in sequence the multiple sequential commands.

17. A non-transitory computer-readable medium storing instructions, the instructions comprising:

one or more instructions that, when executed by one or more processors of an electronic device, cause the one or more processors to:

provide, for display, a first interface that includes information derivable from journaling data collected by a journaling process, the journaling process being configured to record changes made to physical files;

receive a selection of information from the first interface, the selected information including information that is not directly recorded by the journaling process and the information that is derivable from the journaling data collected by the journaling process;

determine, based on the selected information, multiple commands that are understood by the journaling process and that each control the journaling process to retrieve journaling data that derives the selected information;

control the journaling process to execute each of the multiple commands and to retrieve journaling data;

derive, from the retrieved journaling data, additional information that is not directly recorded by the journaling process and that includes information about the changes made to the physical files;

reformat the retrieved journaling data to create a report that includes the additional information, the report including a before image associated with the retrieved journaling data and an after image associated with the retrieved journaling data, and the before image and the after image providing an indication of the changes made to the physical files; and provide, for display on a display screen, a second interface that includes the report with the additional information and that simultaneously includes, on the display screen, the before image and the after image.

18. The non-transitory computer-readable medium of claim 17, where the one or more instructions to determine, based on the selected information, multiple sequential commands that are understood by the journaling process and that each control the journaling process to retrieve journaling data that derives the selected information, further comprise:

one or more instructions that, when executed by the one or more processors, cause the one or more processors to:

determine a set of journaling data needed to derive the selected information; and generate multiple sequential commands to retrieve the set of journaling data as the determined multiple sequential commands.

19. The non-transitory computer-readable medium of claim 17, where the selected information includes file identification information and a time range.

20. The non-transitory computer-readable medium of claim 17, where, when controlling, by the electronic device, the journaling process to execute each of the multiple commands, the one or more processors are further to:

control, by the electronic device, the journaling process to iteratively execute in sequence the multiple sequential commands.

* * * * *